United States Patent [19]
Erving et al.

[11] Patent Number: 5,655,003
[45] Date of Patent: Aug. 5, 1997

[54] WIRELESS TERMINAL HAVING DIGITAL RADIO PROCESSING WITH AUTOMATIC COMMUNICATION SYSTEM SELECTION CAPABILITY

[75] Inventors: Richard Henry Erving, Piscataway; Robert Raymond Miller, II, Morris Township, Morris County; Jesse Eugene Russell, Piscataway, all of N.J.

[73] Assignee: Lucent Technologies Inc., Murray Hill, N.J.

[21] Appl. No.: 529,887

[22] Filed: Sep. 18, 1995

[51] Int. Cl.⁶ .................................................. H04M 11/00
[52] U.S. Cl. .......................... 379/418; 455/434; 455/426; 455/435
[58] Field of Search .................. 379/57, 58, 59; 455/33.1, 33.2, 54.1, 34.1

[56] References Cited

U.S. PATENT DOCUMENTS 5,091,942  2/1992  Dent ........................................ 379/59

*Primary Examiner*—Dwayne Bost
*Assistant Examiner*—Keith Ferguson
*Attorney, Agent, or Firm*—A. G. Steinmetz

[57] ABSTRACT

A wireless terminal utilizing digital radio processing utilizes stored program control to allow the wireless terminal to operate in a plurality of disposed wireless communication systems. In particular, the digital radio processing with appropriate stored program control operates in a plurality of wireless communication system by selectively and controllably enabling selection of frequency, channel bandwidth, modulation type, channel coding and source coding operational components appropriate to the communication system that the wireless unit is to operate in. A function control enables the wireless terminal to actively seek out and search for availability of wireless communications system in which it may operate.

16 Claims, 8 Drawing Sheets

1

WIRELESS TERMINAL HAVING DIGITAL RADIO PROCESSING WITH AUTOMATIC COMMUNICATION SYSTEM SELECTION CAPABILITY

FIELD OF THE INVENTION

The invention relates to a wireless terminal for use in a wireless communication system and in particular to a wireless terminal using digital radio processing. It is especially concerned with digital radio processing having a capability to search for and selectively operate in a plurality of differing wireless communication systems. Such radio processing may be applied to wireless mobile terminals or to fixed radio port terminals. In an illustrative aspect, it concerns a mobile wireless terminal.

BACKGROUND OF THE INVENTION

Digital radio processing often encompasses a digital processing component which under the control of a stored program performs radio signal processing functions which are normally the province of analog circuits in analog radio processing systems. Analog functions such as frequency selection, filtering, demodulation and channel processing are now performed digitally under the control of a stored program. Using a stored program not only allows radio signals to be processed under control of instructions; it readily facilitates flexibility in the performance of other system processes related to the use of signal processing that are not normally considered the processing of radio signals. Many system specific characteristics, such as frequency, channel bandwidth, modulation type, channel coding and source coding may be flexibly accommodated under control of such a stored program. Digital radio processing permits a variety of controls and operational features not available or feasible in radio systems using analog processing

SUMMARY OF THE INVENTION

A wireless terminal utilizing digital radio processing utilizes stored program control to allow the wireless terminal to operate in a plurality of disposed wireless communication systems. In particular, the digital radio processing with appropriate stored program control operates in a plurality of wireless communication system by selectively and controllably enabling selection of frequency, channel bandwidth, modulation type, channel coding and source coding operational components appropriate to the communication system that the wireless unit is to operate in. A function control enables the wireless terminal to actively seek out and search for availability of wireless communications system in which it may operate.

In the illustrative embodiment, a wireless terminal with digital radio processing includes stored program instructions enabling it to operate in a plurality of cellular/PCS formats including AMPS, TDMA (IS-136), EUR-TDMA (GSM), CDMA (IS-95) and several new PCS formats including W-CDMA PCS. The stored program instructions further allow the wireless terminal upon turn on to search and identify which of these wireless communication systems are available for use by the wireless terminal.

Other embodiments may include one-way/unidirectional wireless communications such as paging, broadcast radio, weather radio, and other wireless announcement systems. Push-to-talk such as business band, public safety and CB radio is another exemplary system.

DETAILED DESCRIPTION

Figure 1:
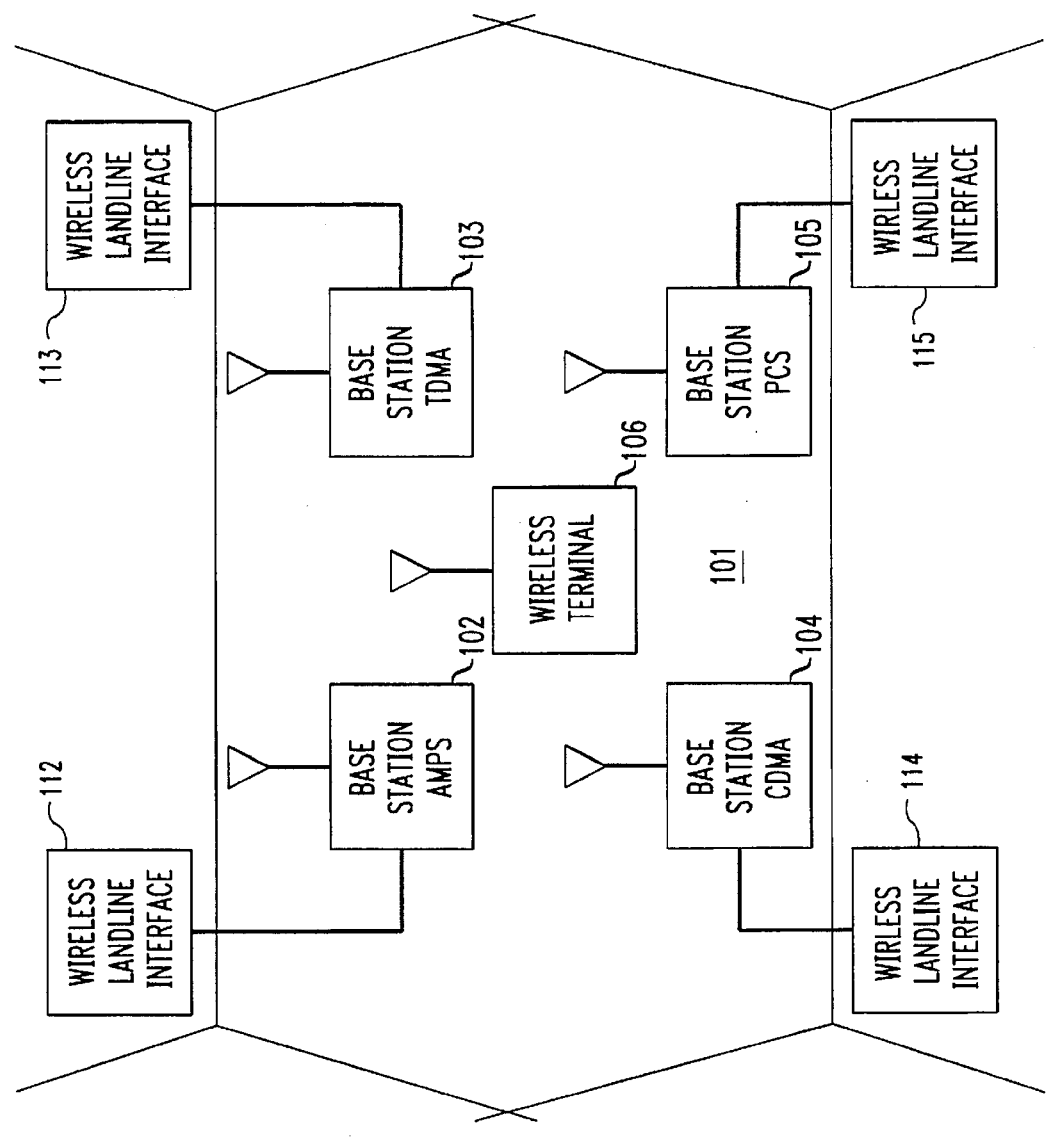
FIG. 1 is a schematic of a subscriber source area serviced by a plurality of cellular/PCS system formats.

Wireless service area 101 mapped in FIG. 1 is serviced by a plurality of wireless communication systems with base stations 102 through 105 each operating with a different format and operating to supply service to mobile wireless terminal 106 having digital radio processing. It is to be understood that these communication systems may also service fixed digital radio terminals. Base station 102 operates within an analog wireless/cellular system and in particular an AMPS system. Base station 102 is connection to the public switched telephone network (PSTN) by wireless landline interface 112. Base stations 103 and 104 supply TDMA and CDMA service respectively, and are connected to the PSTN, via wireless landline interfaces 113 and 114. Base station 105 connected to the PSTN via wireless landline interface 115, supplies PCS service to the wireless terminal 106. While only one illustrative service area 101 is illustrated, each BS may supply a differing service area whose areas may partially or completely overlap service area 101. Wireless terminal 106 in at least one sub area of the area 101 may be accessible to service by one or more of the base stations 102–105, and according to one principle of the invention. Wireless terminal 106 ascertains which of those communication systems are able to provide service. Having determined the available service for selection, the wireless terminal user may select the desired communication service provider.

Figure 2:
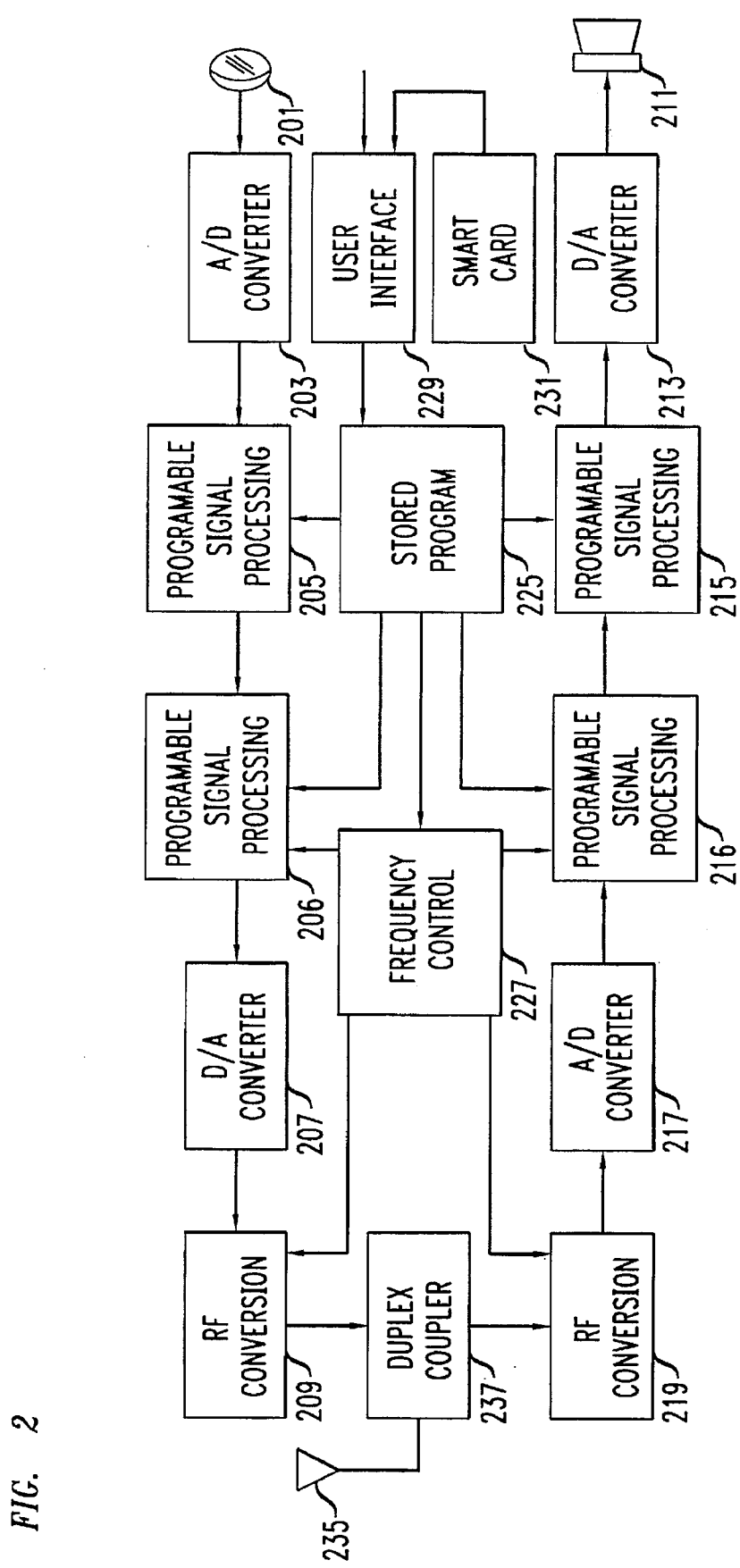
FIG. 2 is a block schematic of a wireless terminal which may operate in a plurality of the formats illustrated in FIG. 1.

A mobile radio terminal, including digital radio processing (DRP), is disclosed in FIG. 2. User analog signal input is applied at input microphone 201 and is converted to digital signals by analog-to-digital converter 203. These digital signals are processed by a digital signal processor 205 which performs digital baseband processing forward error correction signal coding, modulation and related digital signal processing under control of stored program instructions included in stored program source memory 225. Programmable radio processor 206, under control of stored program instructions of stored program source memory 225, and of frequency control 227, provides digital frequency band control for the radio front end. These instructions are included for processing signals in totality in accord with a selected one of a plurality of communication system specifics available in the totality of stored instructions.

The processed signals, with the assigned band, are applied to digital-to-analog converter 207 whose analog signal output is applied to RF conversion circuitry 209. Frequencies for the selected communication system are controlled by frequency control 227 in response to instruction of the stored program in stored program source memory 225. RF signal so controlled is transmitted to antenna 235 and radiated into the air interface.

Radio signals received by antenna 235 are coupled by duplexer coupler 237 to RF converter 219 which performs RF conversion with frequencies specified by frequency control 237 as appropriate for the communication system of the received signal. Analog-to-digital converter 217 converts the RF signal to a digital signal in a form enabling it to be processed by programmable radio processor 216 to provide IF and by programmable signal processor 215 to provide the base band processing. The processed digital signal is converted to an analog signal by digital to analog converter 213 whose output is supplied to the subscriber as an acoustic output signal by acoustic output device 211.

Stored program source 225, in particular, includes program instruction to select system specific communication operating characteristics for operation of the wireless terminal and further includes instructions to request the wireless terminal to interrogate its environment and identify and utilize any and all communication systems that are available. In the illustrative embodiment, this includes the standard cellular/PCS formats, although it is to be understood that with the appropriate stored instruction many other communication systems may be utilized by the wireless terminal. Five particular types of cellular/PCS formats are discussed in the below illustrative embodiment and include AMPS, TDMA (IS-136), EUR-TDMA (GMS), CDMA (IS-95) and W-CDMA.

The AMPS format utilizes a duplexed channel bandwidth of 30 KHz in the 869–894 MHz (downlink) and 824–849 MHz (uplink) cellular bands. Signaling is accomplished by 10 Kb/sec Manchester-encoded frequency shift-keying. The system access channel (downlink) transmits continuously, while uplink access is by mediated burst originations. Bearer (voice) channels utilize companding and phase modulation with vertical service/mobile administration signaling accomplished on the bearer channels via blank-and-burst transmission of 10 Kb/sec Manchester-encoded FSK as above. Error control in signaling is provided via block encoding (BCH) and repeats.

TDMA (IS-136) format utilizes a channel bandwidth of 30 KHz, is band and channel bandwidth-compatible with AMPS, and is an all-digital service. The raw channel rate is 48.6 Kb/sec, transmitted as DQPSK symbols. Error control is provided by convolutional encoding, with interleaving to combat burst errors due to fading. Bearer channels provide six slots per frame which may be used to support six simultaneous users per channel. Currently, each user is provided two slots to provide good speech quality using available 8 Kb/sec codecs. The 8 Kb/sec coding is currently provided by VSELP (Vector-sum excited, linear-predictive coding), but recently-adopted codec standards will allow an alternate algorithm which provides improved voice quality at the 8 Kb/sec rate. DRP can allow selection of such an alternative coder via software control.

CMDA (IS-95) is an all-digital system which is channel-bandwidth incompatible with AMPS and TDMA, utilizing 1.25 MHz channels which multiplexes users by spectrally-spreading their messages using orthogonal code multiplication. The 1.25 MHz bands may be located in the current cellular frequency band in spectrum not occupied by narrowband (AMPS or TDMA) channels. The system provides reliable terminal synchronization by transmitting a pilot channel at higher power level. Modulation is accomplished by BPSK with QPSK spreading. Error control is provided by convolutional encoding. The bearer channels accommodate variable user rates, providing flexible data speeds and opportunity to reduce interference/raise capacity via voice-activity (transmit at lower rate when voice is not present). The current speech codec utilizes QCELP, a CELP (codebook-excited, linear predictive code) variant, but recently a second coder has been standardized which provides higher quality.

EUR-TDMA (GSM) format operates in the 935–960 MHz band for downlink transmission and 890–914 MHz for uplinks. GSM is an all-digital service used primarily in Europe, but is being exported to other areas of the world.

The RF channel bandwidth is 200 KHz, the modulation is GMSK (Gaussian minimum-shift keying) with BT=0.3, and channel throughput is 270.8 Kbits/sec. Bearer channels support 8 user slots, each using a 13 Kb/sec LTP-RPE (long-term prediction, repetitive pulse excitation) coder.

IS-136, IS-95, and GSM (DCS) are being considered for use as mobile services in the newly-created PCS band.

W-CDMA is an emerging standard suitable for use in the ISM (Industrial, Scientific, Medical) unlicensed bands, or in PCS spectrum. Channel bandwidths of 5 and 10 MHz are supported. W-CDMA allows reliable transmission of higher-rate, higher data integrity messages (such as ISDN BRI services) in multipath environments by spreading transmitted signals to a bandwidth larger than the coherence bandwidth of the radio environment. W-CDMA supports flexible user rates from 8 Kb/sec to in excess of 384 Kb/sec to fixed location terminals, while providing low-speed mobility rates to 144 Kb/sec. Grades of service of expressed as $10^3$, $10^4$ and $10^5$ bit error rate (BER) can be accommodated, depending on the rate and application. Modulation accomplished via BPSK with QPSK spreading. A pilot is transmitted by the radio port, as with IS-95, to allow terminal synchronization.

The DRP (digital radio processing) receiver discussed above is constructed with a digitization of a 10 MHz segment of spectrum, allowing each of the above standard formats to be accommodated. The stored program system whose description follows has been developed for determining which systems are available in a geographic location, and to select one or more of them for use based on media to be communicated and/or preference of the user. An understanding of the stored program process can be readily attained by reference to the instruction flow processes illustrated in FIGS. 3 through 8.

Figure 3:
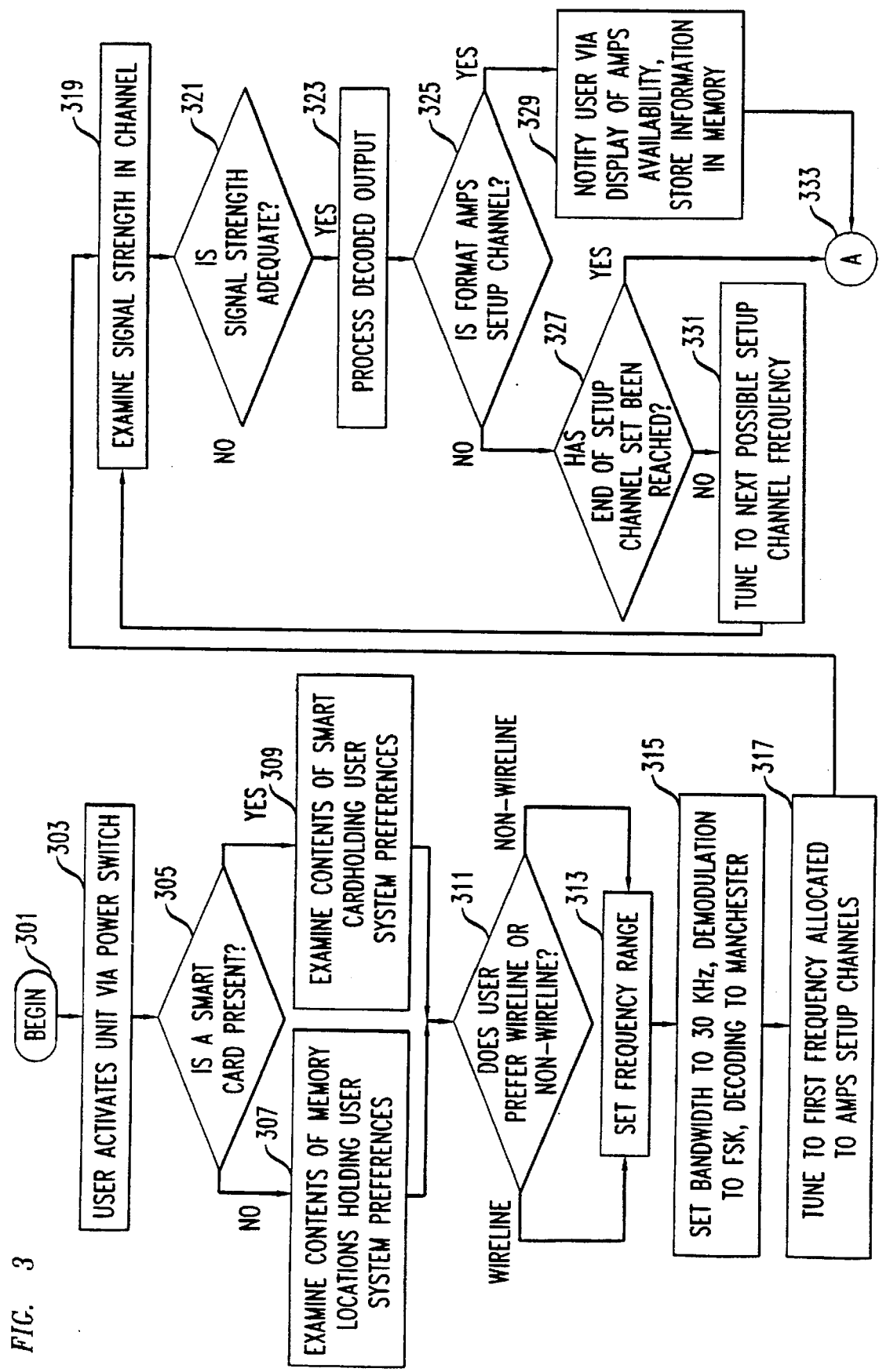
FIGS. 3–8 are flow process diagrams illustrating how a stored program controls selected operations of the wireless terminal of FIG. 2.

Initial power-up (i.e., turn-on) of the wireless terminal is initiated by the subscriber as indicated in the flow process of FIG. 3. The process begins at terminal 301 and power-up is initiated by the user in block 303 by throwing or pushing a switch. In the alternative, the wireless terminal may be programmed to periodically enter a standby mode. Decision block 305 determines whether a smart card 231 has been inserted into the user interface 229 (FIG. 2). If a smart card has been entered (yes) its EEPROM stored memory contents are examined as per block 309, to determine user preferences as to selection of system, features, etc. If no smart card is present, the memory of the wireless terminal is interrogated to determine if user preferences are stored in memory, as per block 307.

Subsequent decision block 311 investigates user preference for wireline or non-wireline service (i.e., A or B service). Instructions respond to this preference by setting the wireless terminal to operate in the proper A or B frequency range as specified in block 313. The first system availability inquiry is to search for and detect existence of an operative AMPS system and in block 315 characteristics of operation pertinent to that system are set by the digital radio processing system in the wireless terminal for operation in the first system searched for. These characteristics include, for example, a bandwidth of 30 MHz, demodulation of frequency shift keying (FSK) and Manchester-decoding.

Stored instructions as indicated in block 317 cause the wireless terminal to be tuned to the first frequency allotted to the set of AMPS set up channels. Instructions of block 319 examine the signal strength of that tuned channel and in decision block 321 adequacy of the signal strength is determined. If signal strength is not adequate (no) the flow process proceeds to decision block 327 and inquires if the totality of available set up channels have been interrogated. The answer determines subsequent program flow as discussed below.

If the decision block 321 determines that the detected signal strength is adequate, the signal is decoded for channel formatting as per the instructions of block 323. Decision block 325 determines if the format is an AMPS set up channel. If it is not (no) flow continues to decision block 327 which determines if any additional set up channels exist. If further channels exist (no) the flow proceeds to block 331 where the radio is digitally tuned to the next possible channel set up frequency. Process flow then returns to block 319 wherein the process proceeds to evaluate the next tuned channel.

If the evaluation of decision block 325 determines that a formatted AMPS channel is available (yes), the user is notified of the same and that information is stored in a memory as per block 329. The flow proceeds to end terminal 323. The same flow ends if the decision block 327 determines that the end of set up channels has been evaluated without finding a suitable AMPS set up channel.

Figure 4:
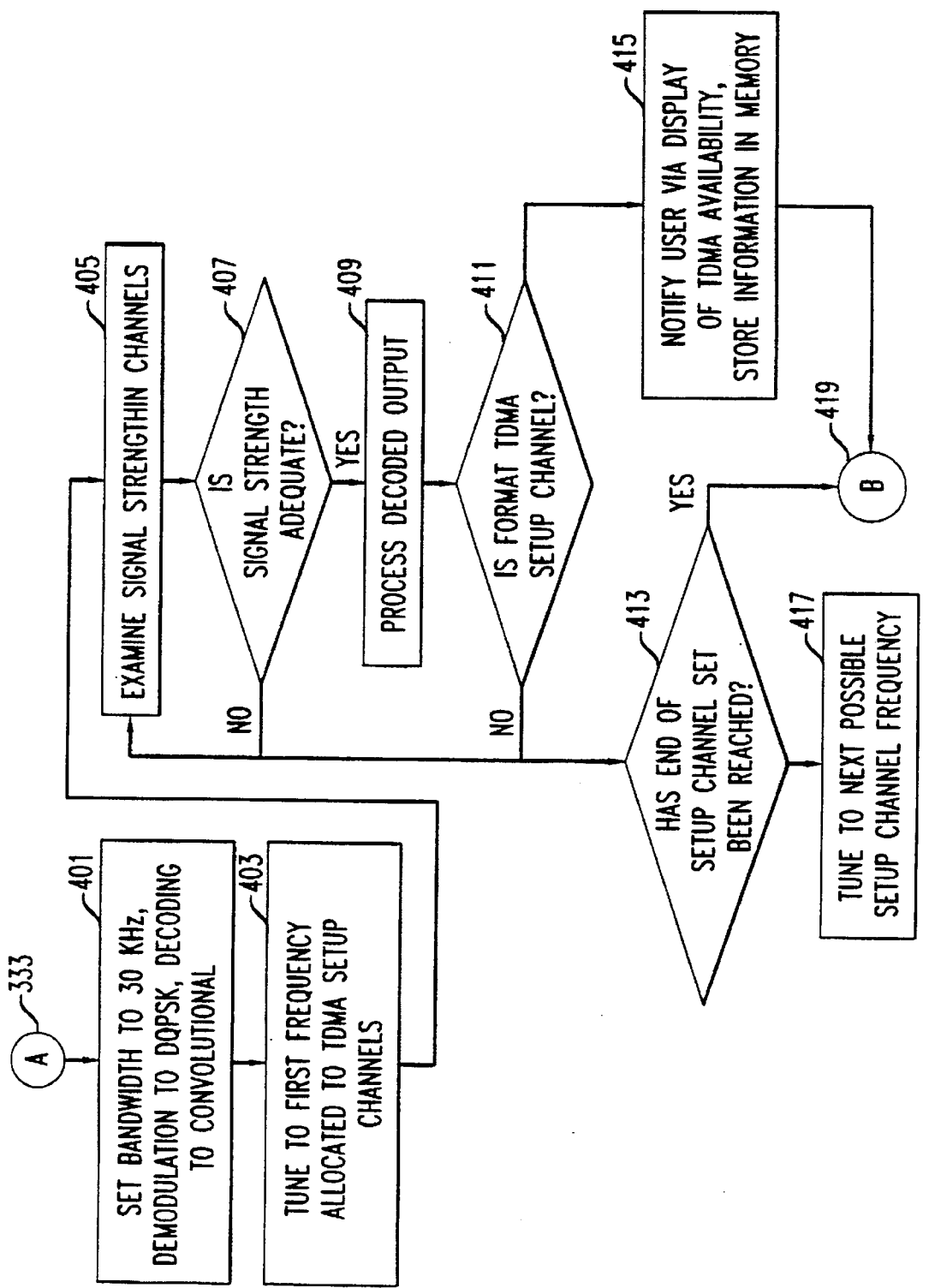

At attainment of the flow process at end terminal 333, a new search process is initiated as shown in FIG. 4, for availability of TDMA communication service. Accordingly, instructions of the stored program in block 401 set processing characteristics in the wireless terminal to 30 KHz bandwidth, DQPSK demodulation and convolutional decoding. In block 403 instructions are included to tune the wireless terminal to the first TDMA set up channel in the channel sets. Its signal strength is determined in block 405 and signal strength adequacy is evaluated in decision block 407. If signal strength is adequate (yes), the decoded signal is processed, as per instructions in block 409, and decision block 411 investigates if a valid TDMA has been found. If a valid TDMA format is found, the flow process proceeds to instruction block 415 and the information of availability of a TDMA system is displayed to notify the user of the same and the availability information is stored in memory. The flow process continues to terminal B 419 which is the entry point to a CDMA search process in FIG. 5.

If decision block 407 determines that set up channel signal strength is inadequate, the flow proceeds to decision block 413 to determine if all available set up channels, in the channel sets, have been searched. If not (no), the flow returns to block 405, via block 417, which tunes the wireless terminal to the next available set up frequency. If all set up channel shave been scanned without finding a valid format (yes), the flow proceeds to terminal B 419.

Figure 5:
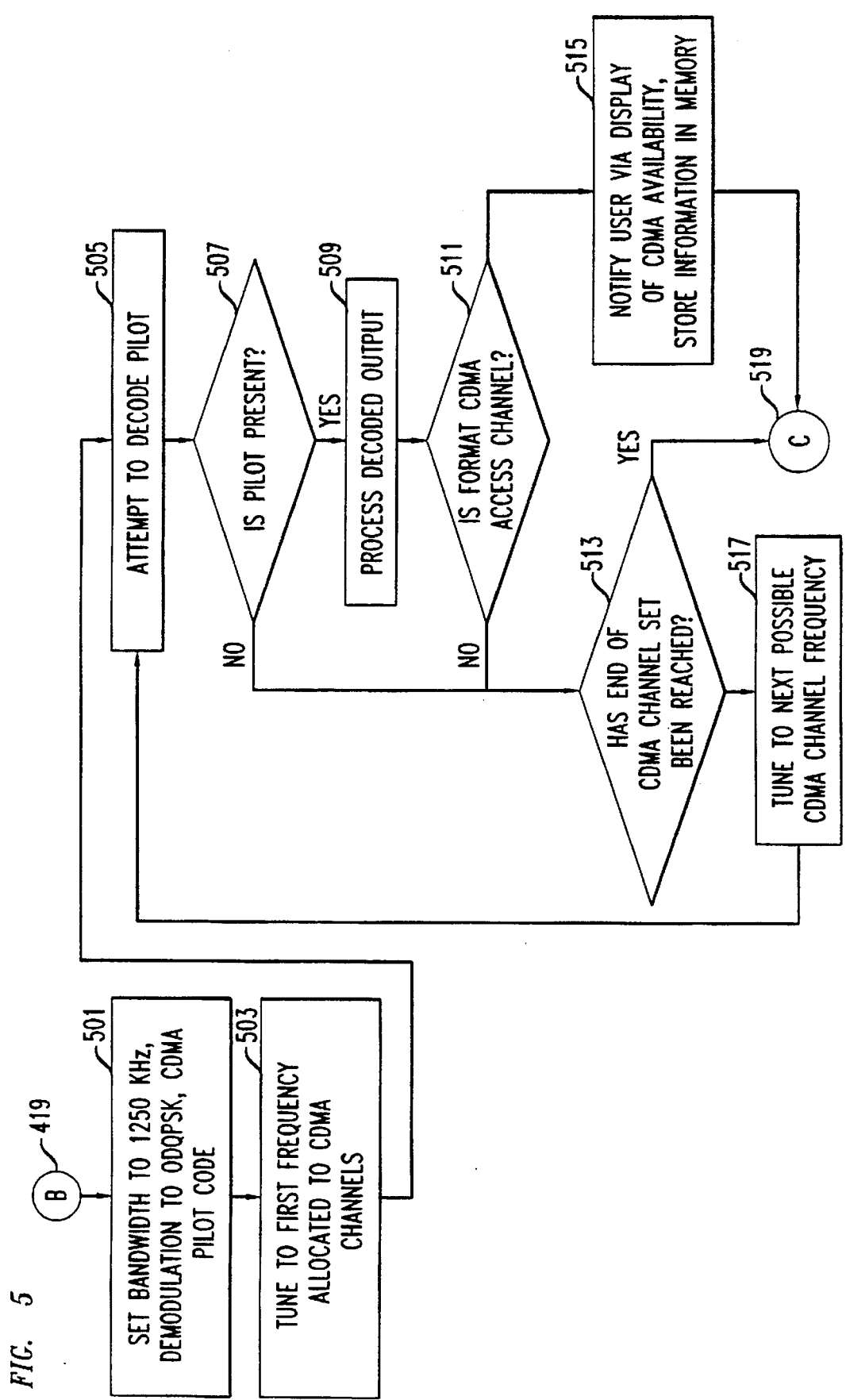

From terminal B 419, the instructions begin a search for an available CDMA system, as shown in FIG. 5, and as per block 501, stored instructions set the wireless terminal to a 1250 KHz bandwidth, ODQPSK demodulation and CDMA pilot decode. The wireless terminal is tuned to the first frequency allotted to the CDMA channels as per block 503. An attempt is made to decode the received pilot signal in block 505 and decision block 507 assures existence of the pilot code (yes). The decoded output, given the pilot code, is decoded in block 509 and decision block 511 then determines existence of a valid format (yes). If the valid format is confirmed, the user is notified, as per block 515, of CDMA system availability and this information is stored in memory. This CDMA search terminates in terminal C 519.

Failure to find a pilot, as per decision block 507, or a valid format, as per decision block 511, guides the flow process to decision block 513 which determines if all CDMA channels in the channel set have been reached. If they have (yes), flow proceeds to terminal C 519 and if not (no), flow proceeds to block 517 where the wireless terminal is tuned to the next CDMA channel frequency. Process flow returns to block 606 where the flow process continues.

Figure 6:
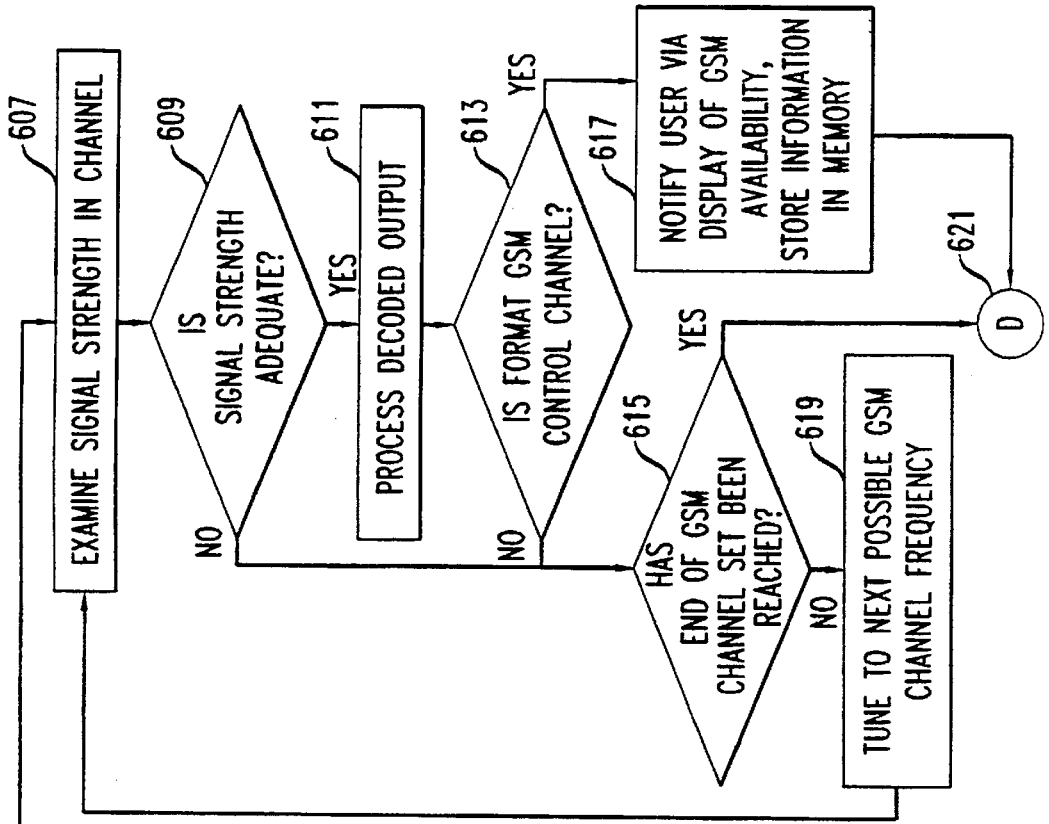
Figure 6:
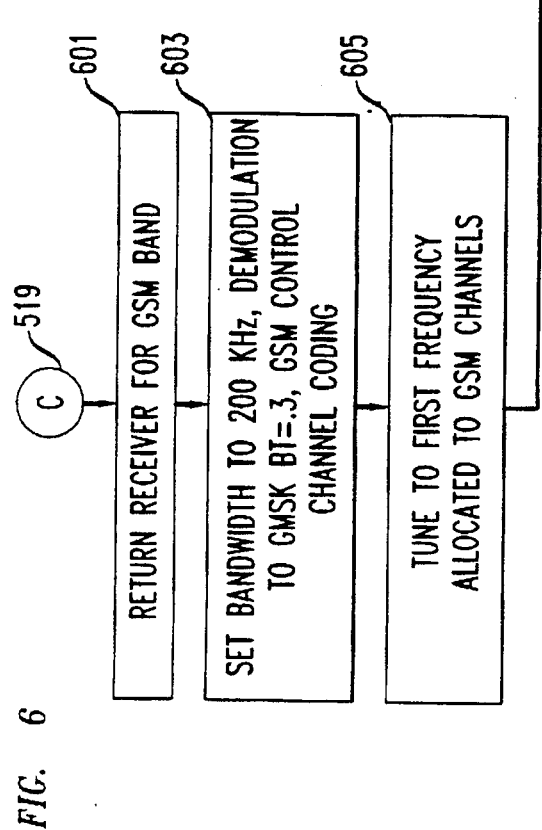

Terminal C 519 is the entrance to block 601, in FIG. 6, which retunes the wireless terminal to the GSM band. The terminal is reconfigured to 200 KHz demodulation, GMSK demodulation, BT=0.3, and GSM control channel coding as per the instructions of block 603. The wireless terminal is tuned to the first allocated GSM channel in block 605 and signal strength is measured and adequacy evaluated in instruction block 607 and design block 609. If satisfactory (yes to block 609), the decoded signal is processed and existence of valid format determined in decision block 613. If the format is valid (yes), the user is notified of GSM availability and the same information is stored in memory as per block 617. Flow proceeds to terminal D-621.

With inadequate signal strength, as per decision block 609 (no) or lack of valid format as per decision block 613 (no), instruction flow continues to decision block 615 to determine if the end of the GSM channel set has been reached. If not (no), the instructions of block 619 tone the wireless terminal to the next possible set up channel and the flow returns to block 607 where the process again evaluates signal strength and for valid format. If the end of the channel set is reached, as per decision block 615 (yes), the flow terminates at terminal D 621.

Figure 7:
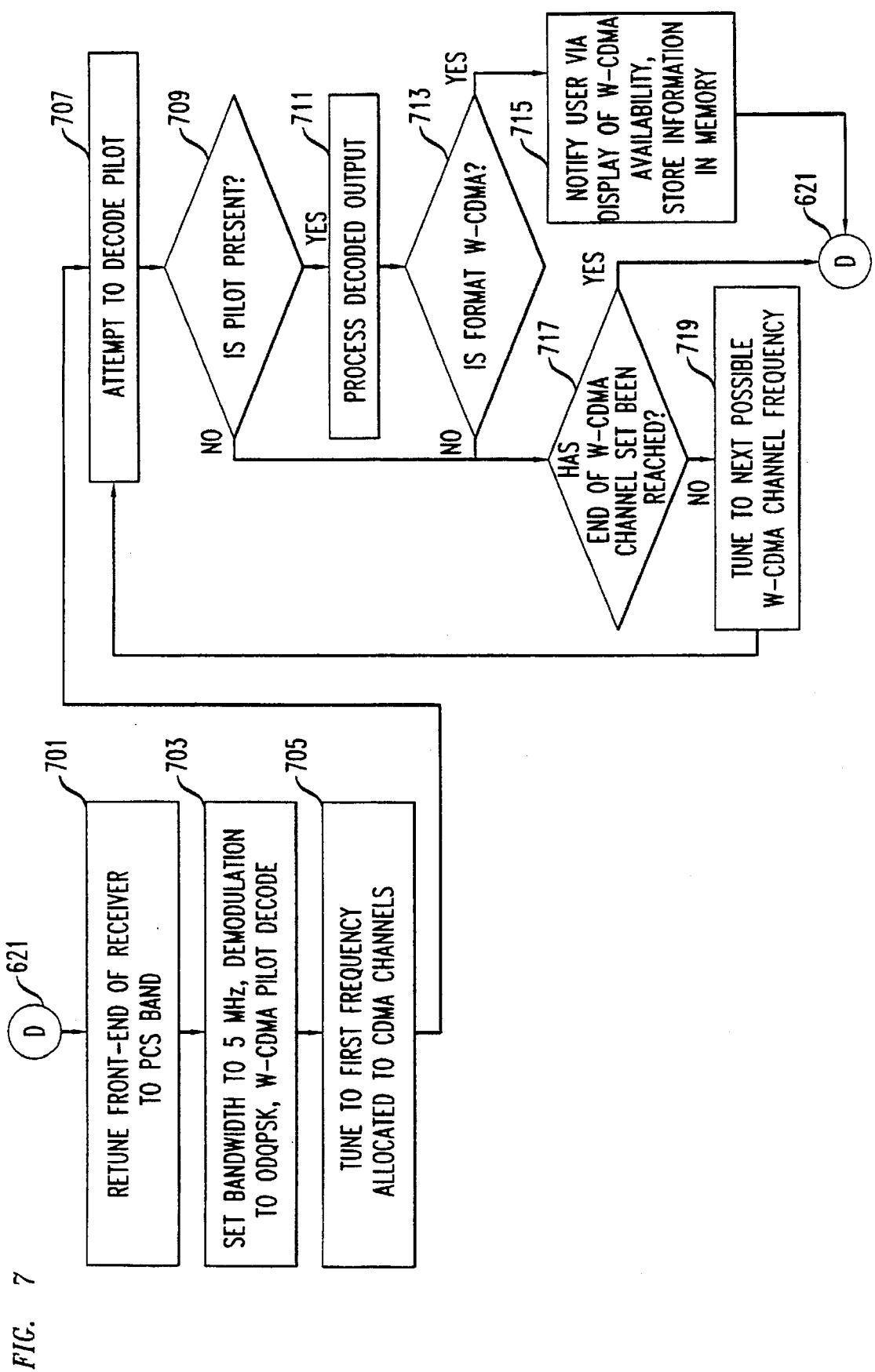

A subsequent flow process begins in terminal D 621 in FIG. 7. Its first step is to return the first end of the receiver to a PCS band or other band, as per the instruction of block 701. Instructions in block 703 set the receive bandwidth to 5 MHz, demodulation to ODQPSK and direct decoding to W-CDMA. The receiver is tuned to the first allotted TO W-CDMA channel in block 705. The presence of the pilot and a decoding attempt is performed according to the instructions of block 707 and 709. With a pilot signal present, the decoded output is processed according to the instructions of block 711. Determination is made as to whether this is a valid format to the W-CDMA signal in decision block 713. With determination of a valid format (yes) in block 713, flow proceeds to block 717, which stores the availability of this system in memory and notifies the user by a display notification. Flow termination is in terminal block E 721.

In the absence of a pilot (no to block 709) or a valid format (no to block 713), flow proceeds to decision block 715 to determine if the end of the W-CDMA channel set has been reached. If it has flow is terminated in terminal E 721. If not (no to decision block 715), the receiver is tuned to the next possible W-CDMA channel frequency, as per the instructions of block 719, and the flow process returns to block 707.

Figure 8:
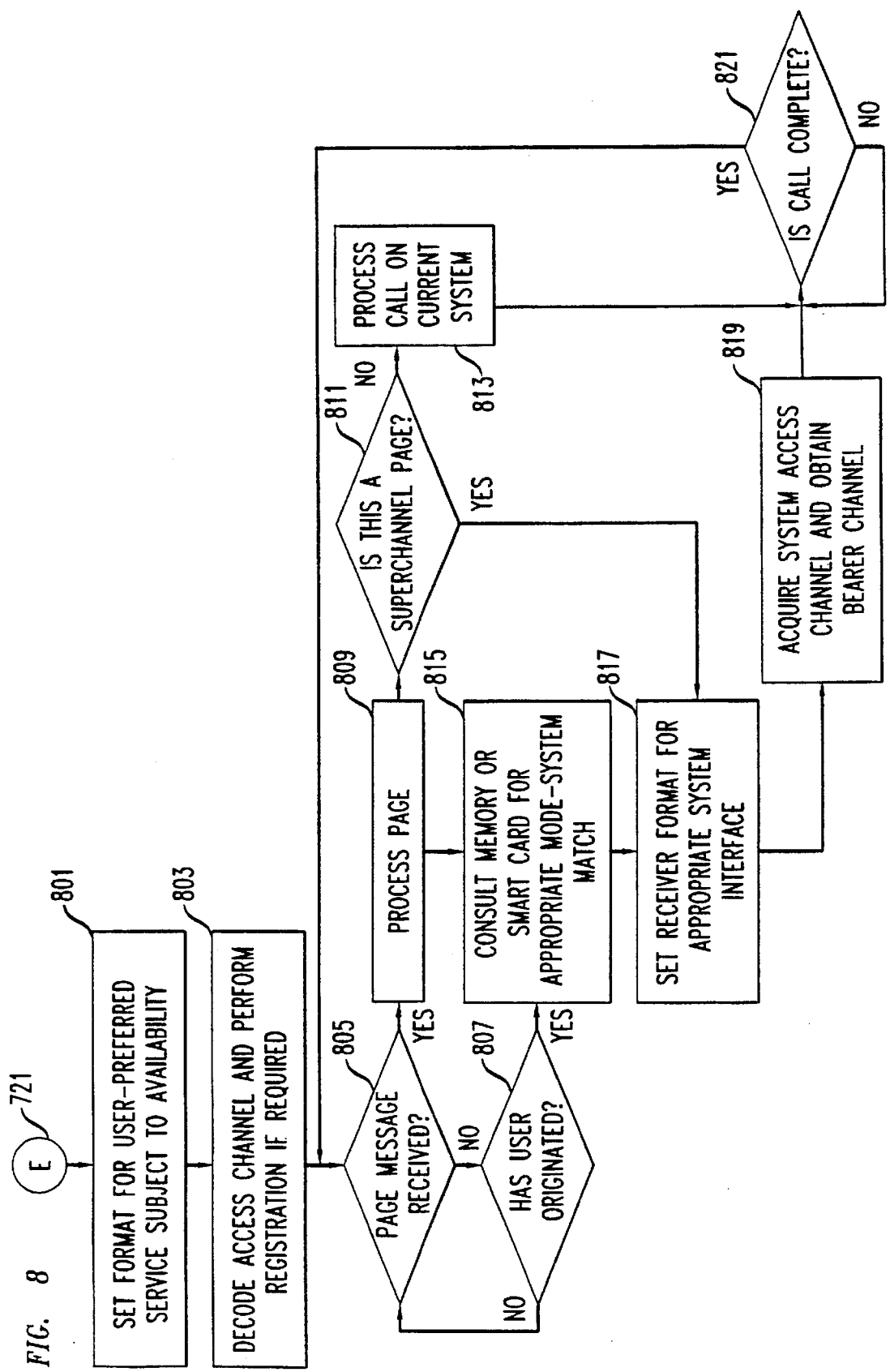

The user selects his/her preference in the flow process of FIG. 8 which starts at terminal E 721. Formatting for the user selected service is performed according to instructions of block 801. Decoding of the access and registration is performed according to the instructions of block 803. Receipt of the page message is determined in decision block (805). With successful reception (yes), the paging message is processed in block 809. If the paging message received indicates information (yes) allowing access to an alternative high capacity system (i.e., a super channel arrangement whereby data is transmitted over a wide band channel and conventional signaling is over a narrowband channel), the flow process is directed by decision block 811 to a block 817 which sets the receiver format for the appropriate system interface. If a conventional system page is received (no), decision block 811 directs the flow to block 813 with instructions to process the call. Duration of the call is monitored by decision block 821 which cycles the process as long as the call is in progress. When the call is complete (yes), the flow process proceeds to decision block 805 awaiting reception of a new paging message. If no paging message is received (no), decision block 807 determines if the user has originated a call. If not (no), flow returns to decision block 805 to await a new paging message. If user has originated a call, instructions in block 815 consult either the memory of a smart card insert or the program memory to determine the appropriate system match. Receive format is set in block 817 and a system and bearer channel are accessed in block 819. Monitoring of the call is performed by decision block 821 as described above.

while the above procedures are described in the context of a mobile wireless terminal other radio telephone and processing equipment may be operated in accord with the invention. One illustrative terminal is a radio port which may be location fixed and include digital radio processing circuitry. In such an application many procedures including system synchronization, forward error correction, forward access channel information for any selected format and data collection may be controlled by digital stored program instructions. A fixed radio port with digital processing may be operated to service mobile terminals also having digital radio processing such as described above. A single digital radio port may service different conventionally analog wireless terminals simultaneously using differing systems formats.

The invention claimed is:

1. A wireless radio telephone terminal with digital radio processing and having equipment for determining an existence of and accessing selected communication systems from a plurality of wireless communication systems; comprising:

an antenna for interfacing with an air interface of the wireless communication systems;

acoustic input/out devices for audio communications with a user of the wireless terminal;

programmable processor means for processing radio signals digitally;

first and second analog-digital conversion means each connecting the programmable processor means to the antenna and acoustic devices, respectively;

a stored program storage source connected to the programmable processor means and including stored instructions for controlling signal processing in the programmable processor means;

the stored instructions including:

the steps of upon power up performing a plurality of preselected automatic interrogation steps for determining the presence of specified air interface systems of differing communication systems;

acknowledging the presence of existing ones of the specified air interface systems;

setting operating characteristics of the wireless terminal to operate in one of the specified air interface systems;

monitoring paging signals and determining operating features desired;

accessing the desired system and monitoring call process, and terminating at call completion.

2. A wireless radio telephone terminal as claimed in claim 1;

the programming processing means including;

means for processing baseband signals and means for processing radio signal for band selection.

3. A wireless radio telephone terminal as claimed in claim 2;

the step of performing a plurality of interrogation steps includes the step of setting a radio band width appropriate to each of a plurality of the specified air interface systems.

4. A wireless radio telephone terminal as claimed in claim 3;

including the step of measuring signal strength of each specified air interface and determining its adequacy for accessing the air interface.

5. A wireless radio telephone terminal as claimed in claim 4;

further including the step of accessing the desired system by sequentially tuning to successive channels available in the system.

6. A wireless radio telephone terminal as claimed in claim 5;

further including the step of setting the receiver format to an appropriate system interface.

7. A wireless radio telephone terminal as claimed in claim 6;

further including the step of determining operative features from the input of a smart card.

8. A wireless radio telephone terminal as claimed in claim 7;

the step of monitoring paging signals includes the step of determining if the paging signal is a superchannel page.

9. A wireless radio telephone terminal as claimed in claim 8;

the step of setting operating characteristics includes a step of sensing and decoding a pilot signal.

10. A wireless radio telephone terminal as claimed in claim 9;

further including a step of notification of availability of one of the specified air interfaces.

11. A wireless radio telephone terminal as claimed in claim 9;

including the further step of setting transmit parameters of the terminal to those required for access to a specified air interface.

12. A wireless radio telephone terminal as claimed in claim 9;

including a step of notification for informing a user of the air interface to which the terminal is assigned.

13. A wireless communication device, comprising:

digital radio processing circuitry with an antenna connected to an RF processing circuitry;

analog/digital conversion circuitry connecting the RF processing circuitry to digital band processing radio circuitry;

the band processing circuitry connected to digital baseband processing circuitry;

digital/analog conversion circuitry connecting the digital baseband processing circuitry to audio input and output;

an analog user interface;

memory circuitry containing a stored program having instructions for controlling the digital band processing circuitry, and the digital baseband processing circuitry;

the instruction including the steps of:
- scanning an air interface for existence of air interfaces of wireless communication systems;
- tuning to acquire access and formatting the digital radio processing circuitry according to the requirement of a selected air interface; and
- processing calls within the selected air interface.

14. A wireless communication device, as claimed in claim 13, comprising:
the step of scanning includes the steps of:
- setting a bandwidth of the band processing circuit for a selected air interface;
- measure a signal strength of a signal of the selected air interface;
- check for an appropriate air interface format; and
- acknowledge availability of the communication system of the selected air interface.

15. A wireless communication device, as claimed in claim 14, comprising:
the step of tuning including a step of sequentially tuning the listed frequencies of the selected air interface.

16. A wireless communication device, as claimed in claim 15, comprising:
the step of processing calls includes the steps of;
- setting the radio processing to the appropriate format;
- registering with the selected communication system;
- acquiring a channel for use within the system; and
- processing the requested call on this acquired channel.

* * * * *